United States Patent
Hyatt et al.

(10) Patent No.: US 9,575,485 B2
(45) Date of Patent: Feb. 21, 2017

(54) COMPOUND MACHINING METHOD AND APPARATUS

(75) Inventors: Gregory A. Hyatt, South Barrington, IL (US); Nitin Chaphalkar, Mt. Prospect, IL (US)

(73) Assignee: MORI SEIKI CO., LTD., Nara (JP)

( * ) Notice: Subject to any disclaimer, the term of this patent is extended or adjusted under 35 U.S.C. 154(b) by 1248 days.

(21) Appl. No.: 13/290,901

(22) Filed: Nov. 7, 2011

(65) Prior Publication Data

US 2012/0096999 A1 Apr. 26, 2012

Related U.S. Application Data

(63) Continuation-in-part of application No. 11/828,233, filed on Jul. 25, 2007, now abandoned.

(Continued)

(51) Int. Cl.
*B23C 3/00* (2006.01)
*B23B 3/22* (2006.01)
(Continued)

(52) U.S. Cl.
CPC .......... *G05B 19/40938* (2013.01); *B23B 3/22* (2013.01); *B23C 2220/48* (2013.01); *B23Q 27/00* (2013.01);
(Continued)

(58) Field of Classification Search
CPC ............ B23B 3/22; Y10T 409/305656; Y10T 409/303752; Y10T 409/303808; Y10T 82/16131; Y10T 82/13; Y10T 82/10; Y10T 409/307616; B23Q 27/00; B23Q 27/006
(Continued)

(56) References Cited

U.S. PATENT DOCUMENTS 4,883,392 A * 11/1989 Lieser .................... 409/165
5,695,305 A * 12/1997 Heym .................... 409/165
(Continued)

FOREIGN PATENT DOCUMENTS

| DE | 58174 C | * | 8/1891 |
| EP | 1 403 747 A2 | | 3/2004 |
| GB | 2065012 A | * | 6/1981 |

OTHER PUBLICATIONS

Choudhury, et al., "Investigation in Orthogonal Turn-Milling Towards Better Surface Finish", Journal of Materials Processing Technology, Elsevier, Amsterdam, NL, vol. 170, No. 3, pp. 487-493, XP005214941, ISSN: 0924-0136.

(Continued)

*Primary Examiner* — Erica E Cadugan
(74) *Attorney, Agent, or Firm* — Miller, Matthias & Hull LLP

(57) ABSTRACT

A method of machining a workpiece may include continuously rotating the workpiece, continuously rotating a tool having at least one cutting surface, and positioning the tool relative to the workpiece so that the at least one cutting surface engages the workpiece at a first discrete location at a periphery of the workpiece. The method may further include continuing to rotate the workpiece and the tool so that the at least one cutting surface engages a second discrete location at the periphery of the workpiece, and controlling a tool surface velocity VT relative to the workpiece surface velocity VW so that the first and second discrete locations are discontinuous. The tool may make multiple iterative passes over the workpiece to engage subsequent discrete locations, wherein the first discrete location, second discrete location, and multiple subsequent discrete locations may form a machined surface that extends continuously around the workpiece.

4 Claims, 13 Drawing Sheets

Related U.S. Application Data

(60) Provisional application No. 60/832,995, filed on Jul. 25, 2006.

(51) Int. Cl.
*B23Q 27/00* (2006.01)
*G05B 19/4093* (2006.01)

(52) U.S. Cl.
CPC ............... *G05B 2219/49092* (2013.01); *G05B 2219/49361* (2013.01); *Y02P 90/265* (2015.11); *Y10T 29/5109* (2015.01); *Y10T 82/10* (2015.01); *Y10T 82/16131* (2015.01); *Y10T 409/303808* (2015.01); *Y10T 409/305656* (2015.01)

(58) Field of Classification Search
USPC ... 409/165, 131–132, 200; 82/53.1, 18, 1.11
See application file for complete search history.

(56) References Cited

U.S. PATENT DOCUMENTS

| | | |
|---|---|---|
| 5,946,991 A | 9/1999 | Hoopman |
| 5,975,987 A | 11/1999 | Hoopman et al. |
| 2004/0154373 A1 | 8/2004 | Mayr et al. |

OTHER PUBLICATIONS

International Search Report for related International Application No. PCT/US2007/074365, report dated Dec. 5, 2007.

\* cited by examiner

Fig. 10 Prior Art
Fig. 11
Fig. 12
Fig. 14
Fig. 13
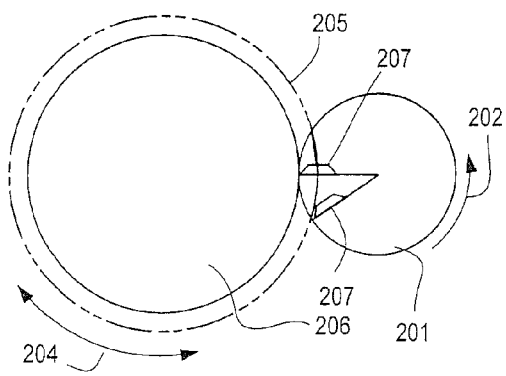
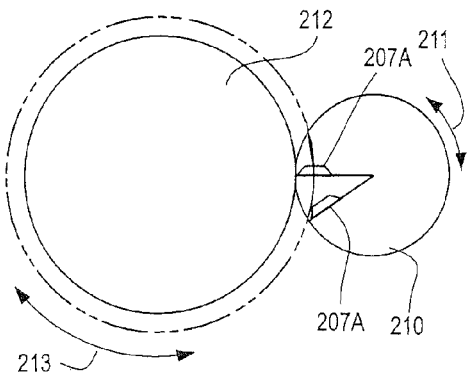
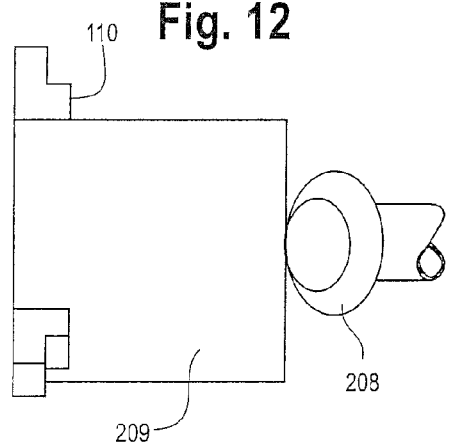
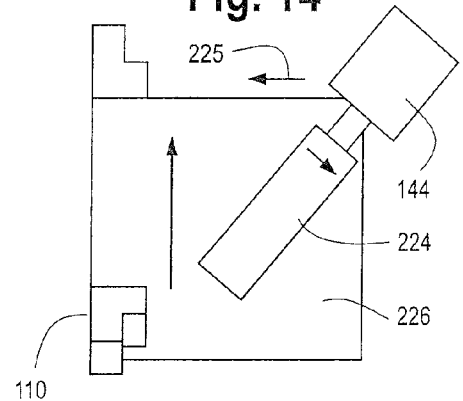
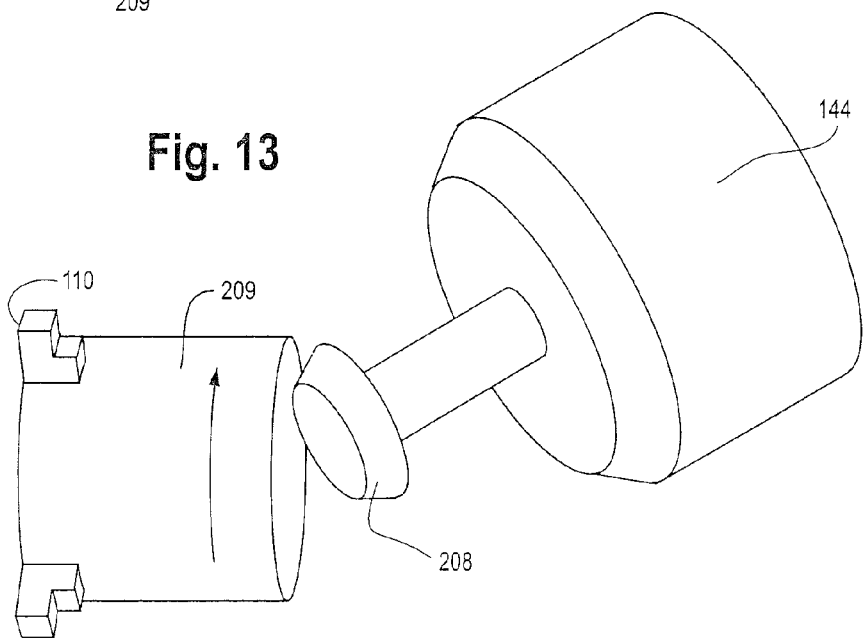

COMPOUND MACHINING METHOD AND APPARATUS

CROSS-REFERENCE TO RELATED APPLICATION

This application is a continuation-in-part of U.S. patent application Ser. No. 11/828,233, filed on Jul. 25, 2007, which in turn claims the benefit of prior U.S. Provisional Application No. 60/832,995, filed Jul. 25, 2006. The contents of these related applications are hereby incorporated by reference in their entirety.

TECHNICAL FIELD

This disclosure generally relates to machine tools and, more particularly, to computer numerically controlled machine tools and associated methods.

BACKGROUND OF THE DISCLOSURE

Machining processes, such as milling, turning, broaching, shaping, and hobbing, are processes that require relative motion between the work and the tool. In conventional linear processes (shaping and broaching) the cutting speed, i.e., the velocity of relative motion between work and tool is equal to the feed velocity. In conventional rotating processes (turning, hobbing, and milling) the rotation of the work or tool allows cutting speeds that are greater than the feed velocity by typically two orders of magnitude or more.

Traditionally, each of the cutting processes has been performed by a machine designed and built specifically for that process. For example, a typical turning machine, or lathe, rotates the workpiece at high velocity against a tool moving on a linear path at a low velocity. A conventional mill rotates a tool at high velocity against a workpiece moving on a linear path at low velocity.

More recently, computer numerically controlled mill/turn machines have become available. Milling on these machines has been accomplished by substituting rotation of the work at very low velocities for linear feed at low velocity. The rotational speed of the work emulates the feed velocity of conventional milling, typically one to ten feet per minute. The rotational velocity of a milling tool typically falls between 100 and 10,000 feet per minute, with most operations performed between 500 and 2,000 feet per minute.

SUMMARY OF THE DISCLOSURE

It has been found that a machine may be operated in a compound machining operation, wherein both the workpiece and the tool move (in many cases each by rotating) when the tool is in contact with the workpiece. For instance, a rotating workpiece and a rotating tool may be provided, and the tool and workpiece each may be rotating when brought into contact with one another. In some embodiments this allows an increase in power that is applied to the workpiece relative to, for instance, a conventional turning operation.

The rotation of the tool and of the workpiece together result in a relative velocity of rotation between the tool and workpiece. The same relative velocity may be obtained under various different processing parameters, including rotational speed of the tool, rotational speed of the workpiece, and feed rate. In some embodiments, the invention contemplates algorithmic determination of processing parameters to enable a compound machining operation given one or more selected parameters. For instance, a relative velocity and workpiece rotational speed may be selected, and other processing parameters, such as a feed rate and tool rotational velocity, may be determined therefrom. In some embodiments, the algorithmic computations may be performed on a machine, such as a computer numerically controlled machine. In other embodiments, the algorithmic computations may be performed manually or on a computing device remote from the machine.

In some embodiments, the invention provides a computer program product comprising a computer-readable medium having disposed thereon code for causing calculations and/or machine operations in accordance with the subject matter described herein. The computer-readable medium may be a component of a computer numerically controlled machine (such as a memory or storage device thereof) or may be a computer readable medium that is not a component thereof (for instance, a memory or storage of a separate computing device).

In some embodiments, a computer numerically controlled machine is provided. The computer numerically controlled machine may contain a computer program product having disposed thereon code for causing calculations and/or code for causing machine operations in accordance with the subject matter described herein.

In some embodiments, a machine having at least a first retainer and a second retainer is provided. The first retainer retains a workpiece and the second retainer retains a rotating tool. In any suitable order, the workpiece and tool each are rotated at a surface velocity of at least 25 m/min. The first retainer is moved relative to the second retainer in a direction having at least a z-axis component to cause the tool to contact the workpiece. The rotation of the tool relative to the workpiece is sufficient to result in removal of material from the workpiece, and in some embodiments, to result in removal of discrete chips of material from the workpiece. The rotation of the tool and workpiece may be synchronous or asynchronous, or asynchronous over a portion of the range of travel of the tool relative to the workpiece as is sufficient to remove a discrete chip of material from the workpiece. The machine may be a computer numerically controlled machine.

In another embodiment, the invention provides a computer numerically controlled machine that is provided with a computer readable medium that contains programming to accomplish the foregoing.

In certain embodiments, the invention provides a number of advantages. By causing rotation of the workpiece and the tool, an increase in overall processing power may be provided in some embodiments relative to conventional roughing operations without causing a significant increase in torque on the workpiece or main spindle. In some embodiments, the duty cycle of the tool is reduced, such that the tool may be rotated at a higher rotational speed than is conventionally permitted without incurring disabling thermal damage to the tool. The machine may be operated in some embodiments to remove discrete broken chips from the workpiece rather than a single unbroken chip, thus reducing machine downtime and facilitating processing.

Milling and other tooling operations generally may be accomplished in multiple steps, typically including one or more roughing operations in which relatively large amounts of material are removed from the workpiece, and typically also including one or more finishing operation in which relatively small amounts of material are removed from the workpiece. The invention, in certain embodiments, contemplates roughing operations performed in a computer numerically controlled machine. In some embodiments, such as knurling or grooving operations, the surface yielded after a compound machining operation may itself be regarded as the finished surface. In practice, operation of a computer numerically controlled machine in accordance with certain embodiments of the invention has resulted in a workpiece with a knurled-like pattern on the surface. The invention contemplates an apparatus and method for forming a knurled surface on a workpiece. Additionally, the invention contemplates embodiments in which processing parameters effective to produce a desired knurled-like pattern are selected, and in which computer numerically controlled machine is operated in accordance with the selected parameters to remove material from a workpiece to form a knurled-like pattern on the surface of the workpiece.

According to certain aspects of this disclosure, a method of machining a workpiece may include continuously rotating the workpiece, continuously rotating a tool having at least one cutting surface, and positioning the tool relative to the workpiece so that the at least one cutting surface engages the workpiece at a first discrete location at a periphery of the workpiece. The method may further include continuing to rotate the workpiece and the tool so that the at least one cutting surface engages a second discrete location at the periphery of the workpiece, and controlling a tool surface velocity $V_T$ relative to the workpiece surface velocity $V_W$ so that the first and second discrete locations are discontinuous.

In another aspect of this disclosure that may be combined with any of these aspects, the workpiece and the tool may be rotated for a sufficient duration so that the tool traverses multiple iterative passes around the periphery of the workpiece, and the tool may be positioned so that the at least one cutting surface engages multiple second discrete locations at the periphery of the workpiece, wherein the first discrete location, the second discrete location, and the multiple subsequent discrete locations form a machined surface on the workpiece that extends continuously around the workpiece.

In another aspect of this disclosure that may be combined with any of these aspects, a relative surface velocity $V_R$ may be equal to a vector sum of the workpiece surface velocity $V_W$ and the tool surface velocity $V_T$, and controlling the tool surface velocity $V_T$ relative to the workpiece surface velocity $V_W$ may include selecting a tool surface velocity $V_T$ and a workpiece surface velocity so that the relative surface velocity $V_R$ does not equal zero.

In another aspect of this disclosure that may be combined with any of these aspects, the workpiece surface velocity $V_W$ may have a corresponding workpiece rotational speed $N_W$ and the tool surface velocity $V_T$ may have a corresponding tool rotational speed $N_T$, and controlling the tool surface velocity $V_T$ relative to the workpiece surface velocity $V_W$ may include selecting a tool rotational speed $N_T$ that is not an integer multiple of the workpiece rotational speed $N_W$.

In another aspect of this disclosure that may be combined with any of these aspects, the workpiece surface velocity $V_W$ may be at least 25 m/min.

In another aspect of this disclosure that may be combined with any of these aspects, a method for generating a set of compound machining parameters for a machine tool may include selecting a first parameter corresponding to a desired relative surface velocity $V_R$ that is equal to a vector sum of a workpiece surface velocity $V_W$ and a tool surface velocity $V_T$, selecting a second parameter from a group of machining parameters including a desired workpiece surface velocity $V_W$ and a desired tool surface velocity $V_T$, and determining a third parameter based on the desired relative surface velocity $V_R$ and the second parameter, wherein the third parameter comprises a remaining parameter from the group of machining parameters.

In another aspect of this disclosure that may be combined with any of these aspects, the desired relative surface velocity $V_R$ may be selected so that it does not equal zero.

In another aspect of this disclosure that may be combined with any of these aspects, each of the desired workpiece surface velocity $V_W$ and the desired tool surface velocity $V_T$ may be at least 25 m/min.

In another aspect of this disclosure that may be combined with any of these aspects, a desired workpiece rotational speed $N_W$ may be determined based on the desired workpiece surface velocity $V_W$ and a diameter of the workpiece $D_W$, and a desired tool rotational speed $N_T$ may be determined based on the desired tool surface velocity $V_T$ and a diameter of the tool $D_T$.

In another aspect of this disclosure that may be combined with any of these aspects, a rotational ratio $R_W$ of the desired tool rotational speed $N_T$ to the desired workpiece rotational speed $N_W$ may be determined, and at least one of the desired rotational speed $N_W$ and the desired tool rotational speed $N_T$ may be modified so that the rotational ratio $R_W$ is not an integer.

In another aspect of this disclosure that may be combined with any of these aspects, the second parameter may comprise the desired workpiece surface velocity $V_W$ and the third parameter comprises the desired tool surface velocity $V_T$.

In another aspect of this disclosure that may be combined with any of these aspects, the second parameter may comprise the desired tool surface velocity $V_T$ and the third parameter comprises the desired workpiece surface velocity $V_W$.

In another aspect of this disclosure that may be combined with any of these aspects, a computer implemented method is provided, under control of a processor communicatively coupled to an input device, for generating a set of compound machining parameters for a machine tool. The method may include inputting from the input device a first parameter corresponding to a desired relative surface velocity $V_R$ that is equal to a vector sum of a workpiece surface velocity $V_W$ and a tool surface velocity $V_T$, inputting from the input device a second parameter selected from a group of machining parameters including a desired workpiece surface velocity $V_W$ and a desired tool surface velocity $V_T$, calculating a third parameter based on the desired relative surface velocity $V_R$ and the second parameter, wherein the third parameter comprises a remaining parameter from the group of machining parameters, and communicating the second and third parameters to an output device.

In another aspect of this disclosure that may be combined with any of these aspects, the desired relative surface velocity $V_R$ may be selected so that it does not equal zero.

In another aspect of this disclosure that may be combined with any of these aspects, each of the desired workpiece surface velocity $V_W$ and the desired tool surface velocity $V_T$ may be at least 25 m/min.

In another aspect of this disclosure that may be combined with any of these aspects, a desired workpiece rotational speed $N_W$ may be determined based on the desired workpiece surface velocity $V_W$ and a diameter of the workpiece $D_W$, a desired tool rotational speed $N_T$ may be determined based on the desired tool surface velocity $V_T$ and a diameter of the tool $D_T$, and the desired tool rotational speed $N_T$ and the desired workpiece rotational speed $N_W$ may be communicated to the output device.

In another aspect of this disclosure that may be combined with any of these aspects, a rotational ratio $R_W$ of the desired tool rotational speed $N_T$ to the desired workpiece rotational speed $N_W$ may be determined, and at least one of the desired rotational speed $N_W$ and the desired tool rotational speed $N_T$ may be modified so that the rotational ratio $R_W$ is not an integer.

In another aspect of this disclosure that may be combined with any of these aspects, the second parameter may comprise the desired workpiece surface velocity $V_W$ and the third parameter may comprise the desired tool surface velocity $V_T$.

In another aspect of this disclosure that may be combined with any of these aspects, the second parameter may comprise the desired tool surface velocity $V_T$ and the third parameter may comprise the desired workpiece surface velocity $V_W$.

BRIEF DESCRIPTION OF THE DRAWINGS

FIG. 10 is a representation of a portion of a computer numerically controlled machine operating in accordance with a prior art milling process;

FIG. 11 is a representation of a portion of a computer numerically controlled machine operating in accordance with one embodiment of the invention, illustrating a compound machining operation;

FIG. 12 is a front view, and 13 a perspective view, of a tool and workpiece in a compound machining operation in accordance with one embodiment of the invention, the workpiece being retained within a chuck of a computer numerically controlled machine and a honing tool being retained in a spindle of the machine;

FIG. 14 is a front view, and FIG. 15A a perspective view, of a tool and workpiece in a compound machining operation performed in accordance with another embodiment of the invention, the workpiece being retained within a chuck of a computer numerically controlled machine and a peripheral cutting and end mill being retained within a spindle of the machine, FIG. 14 illustrating the beginning of the operation and FIG. 15A illustrating the operation in progress;

Figure 1:
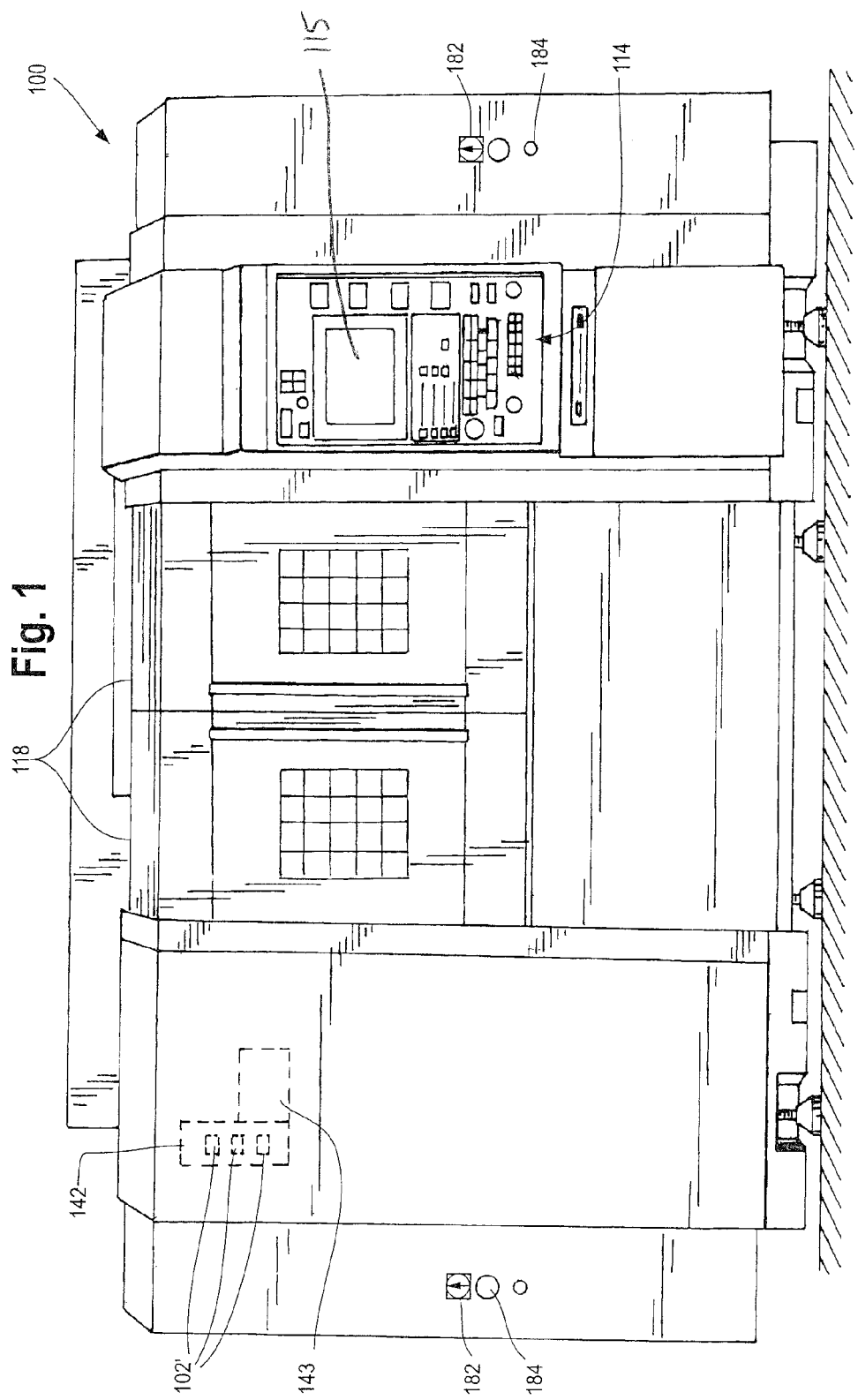
FIG. 1 is a front elevation of a computer numerically controlled machine in accordance with one embodiment of the present invention, shown with safety doors closed.

The figures are not intended to be scale. For instances, in FIGS. 10, 11, and 22, the difference between the initial and machined diameter of the workpieces illustrated is exaggerated for purposes of discussion.

DETAILED DESCRIPTION

In one embodiment, a method is provided for a workpiece and a milling tool that includes selecting at least one processing parameter for a compound machining operation in which the workpiece and milling tool each rotate at a rate of at least 25 m/min, and algorithmically determining other processing parameters for said compound machining operation.

In another embodiment, a computer program product comprises a computer readable medium having disposed thereon code for algorithmically determining processing parameters for a compound machining operation for a workpiece and a milling tool given at least one a selected processing parameter for a compound machining operation.

In another embodiment, a computer numerically controlled machine comprises at least first and second retainers, each of said first and second retainers comprising one of a spindle retainer, a turret retainer, a first chuck and a second chuck; at least one cutting tool, said at least one cutting tool being operatively connected to said one of said retainers; and a computer control system operatively coupled to said first retainer and to said second retainer and causing said first retainer to move relative to said second retainer, said computer control system including a computer readable medium having disposed thereon code for algorithmically determining processing parameters effective for compound machining of a workpiece using a tool, given a preselected processing parameter for said compound machining.

In another embodiment, a method comprises providing a computer numerically controlled machine, said machine having at least a first retainer retaining a workpiece, and a second retainer retaining a milling tool, and in any suitable order, rotating said workpiece and rotating said tool, each of said workpiece and said tool being rotated to provide a surface velocity of at least 25 m/min, and moving said first retainer relative to said second retainer to cause said tool to contact said workpiece in a compound machining operation.

In another embodiment, a computer numerically controlled machine comprises at least first and second retainers, each of said first and second retainers comprising one of a spindle retainer, a turret retainer, a first chuck and a second chuck, at least one cutting tool, said at least one cutting tool being operatively connected to said one of said retainers; and a computer control system operatively coupled to said first retainer and to said second retainer and causing said first retainer to move relative to said second retainer, said computer control system including a computer readable medium having disposed thereon code for causing in any suitable order rotation of said workpiece and rotation said tool to provide a surface velocity of at least 25 m/min for each of said workpiece and said tool; and for causing said first retainer to move relative to said second retainer to cause said tool to contact said workpiece in a compound milling operation.

In another embodiment, a method comprises providing a computer numerically controlled machine, said machine having at least a first retainer retaining a workpiece, and a second retainer retaining a tool, and in any suitable order, rotating said workpiece and rotating said tool, each of said workpiece and said tool being rotated to provide a surface velocity of at least 25 m/min; and moving said first retainer relative to said second retainer to cause said tool to contact said workpiece and to remove material to thereby cause formation of a knurled-like pattern on the surface of said workpiece.

In another embodiment, a method comprises providing a computer numerically controlled machine, said machine having at least a first retainer retaining a workpiece, and a second retainer retaining a tool, selecting processing parameters effective for formation of a knurled-like pattern on the surface of said workpiece, said processing parameters comprising speed of rotation of a workpiece, speed of rotation of a tool, and a phase difference between said rotation of said workpiece and said rotation of said tool, the rotation of said tool relative to said workpiece being sufficiently asynchronous to cause formation of a knurled surface on said workpiece; and operating said computer numerically controlled machine under said processing parameters to remove material to provide a knurled-like pattern on at least a portion of said workpiece.

In another embodiment, a computer numerically controlled machine comprises at least first and second retainers, each of said first and second retainers comprising one of a spindle retainer, a turret retainer, a first chuck and a second chuck, at least one cutting tool, said at least one cutting tool being operatively connected to said one of said retainers, and a computer control system operatively coupled to said first retainer and to said second retainer and causing said first retainer to move relative to said second retainer, said computer control system including a computer readable medium having disposed thereon code for causing rotation of a workpiece at a rotational velocity of at least 25 m/min and code for causing rotation of a tool at a rotational velocity of at least 25 m/min, and code for causing said first retainer to move relative to said second retainer to cause said tool to contact said workpiece under processing conditions effective to cause discrete chips of material to be removed from said workpiece.

In another embodiment, a method for determining the suitability of compound machining parameters comprises determining, for a workpiece of a preselected size and material, and a tool of a preselected configuration, a relative velocity of rotation between said tool and said workpiece; and determining whether the power availability of a computer numerically controlled machine is sufficient to permit compound machining at said relative contact rate.

In another embodiment, a computer program product comprises a computer readable medium containing computer program code for determining, for a workpiece of a preselected size and material, and a tool of a preselected configuration, a relative velocity of rotation between said tool and said workpiece; and for determining whether the power availability of a computer numerically controlled machine is sufficient to permit compound machining at said relative contact rate.

The foregoing embodiments are not mutually exclusive.

In some embodiments, various compound machining operations may be performed using a computer numerically controlled machine. This disclosure is not limited to a specific type of compound machining operation, and it is contemplated that operations such as knurling, grooving, roughing, and the like may be performed in connection with the present teachings. In some embodiments an algorithmic determination is used to process parameters for a compound machining operation; in other embodiments, a computer numerically controlled machine is used, and in other embodiments, a computer program comprising a computer-readable medium having program code disposed thereon is used. Again, these embodiments are not limited to a specific type of compound machining operation.

Except as otherwise claimed, this disclosure is not limited to embodiments wherein both the tool and workpiece rotate. It is contemplated, for instance, that the compound machining operation may employ a workpiece that translates rapidly relative to a tool. In many embodiments, however, the tool and workpiece each rotate. Similarly, unless otherwise claimed, this disclosure is not limited to operation on a computer numerically controlled machine, and it is contemplated that machines that are otherwise controlled are operable.

By rotating both the workpiece and the tool in a compound machining operation, material may be removed from the workpiece. Generally, numerous variables can affect the compound machining operation. These can include, for instance and without limitation, the workpiece diameter ($D_W$), the rotational speed of the tool ($N_T$) (expressed as 1/time, for instance as RPM), the rotational speed of the workpiece ($N_W$), the width of the tool ($W_T$), the tool diameter ($D_T$), the number of cutting teeth on the tool ($Z_T$), the feed rate (FR) (sometimes expressed as a feed rate per tooth ($F_T$)), the desired turning velocities of the workpiece and tool ($V_W$ and $V_T$, each representing the velocity of a point on the surface of the workpiece or tool), the depth of cut ($DOC_T$) the composition of the workpiece, the angle of impingement of the tool on the workpiece, and other factors. Additionally, the ability to effectuate compound machining is limited by the power available in the computer numerically controlled machine.

The relative velocity of rotation ($V_R$) between a tool and workpiece can be related according to the following algorithm:

$$V_R = (DIR1 * V_W) + (DIR2 * V_T)$$

where DIR1 and DIR2 are variables that account for the angle at which the tool contacts the workpiece and/or for the direction of rotation of the tool and workpiece. $V_R$ is a velocity figure, expressible conveniently in units such as surface feet per minute (SFM). Problems may arise in the machining process if the relative velocity ($V_R$) between the tool and the workpiece approaches zero. Certain characteristics of the tool and the machining process can affect how closely $V_R$ can approach to zero, such as the clearance angle of the cutting edge and the radius of the tool.

In accordance with one embodiment of the invention, one or more processing parameters for compound machining are selected, and one or more other processing parameters are algorithmically determined. For instance, in accordance with one embodiment, a $V_R$ is selected to be approximately equal to a predetermined or preselected desired milling velocity, and one or more other parameters of the compound machining operation are determined based thereon. In some embodiments, both $V_R$ and another parameter are selected, and other processing parameters are selected based thereon. For instance, in some embodiments, both $V_R$ and $V_W$ are selected, and other processing parameters are determined based thereon. In some embodiments, both $V_R$ and $N_W$ are selected, and other processing parameters are determined based thereon.

The limits of the computer numerically controlled machine and tool employed, and possibly other limits and restrictions, may affect the selection of processing parameters. For instance, if a selected $V_R$ and $V_W$ would require a tool rotational speed that is beyond the maximum tool rotational speed of the computer numerically controlled machine, new processing parameters should be selected. Similarly, if the processing power required would exceed the power of the computer numerically controlled machine, new parameters should be selected.

In some embodiments, the rotation of the tool and workpiece may be synchronous within the limits of operation of the machine. In other embodiments, the rotation of the tool and workpiece are asynchronous over the entire range of travel of the tool relative to the workpiece. Asynchronous rotation contemplates rotation with a difference in relative phase between the tool and workpiece, such that the radial position of the tool and workpiece upon initial contact do not coincide at the same rotational position over a suitable given period. The rotation of the tool relative to the workpiece may be completely asynchronous over the entire course of a compound machining operation. In some embodiments, the rotation of the tool relative to the workpiece is asynchronous over a portion of the range of travel of the tool relative to the workpiece as is sufficient to remove a discrete chip of material from the workpiece. For instance, the rotation of the tool and workpiece may be sufficiently asynchronous to cause discrete chips of material to be removed from the workpiece. The rotational ratio of the tool rotation to workpiece rotation will depend on factors including, inter alia, the feed rate. Generally, an asynchronous tool rpm:workpiece rpm ratio is not a lower integer multiple (1:1, 2:1, 3:1, etc.) but may be a ratio such as 1.0001:1 or any other suitable value.

For instance, one method for determining suitable compound machining parameters can proceed per the following (these steps need not be performed in the order recited):

(1) After selecting Vw, calculate a workpiece RPM:

$$Nw(\text{rpm}) = (12 \times Vw)/(Dw \times \pi)$$

In this equation, Vw is provided in surface feet per minute (SFM), and Dw in inches. A similar calculation may be made for metric or other units.

(2) Confirm that the workpiece RPM does not exceed the capacity of the computer numerically controlled machine (e.g. the lathe main spindle).

(3) Calculate the desired tool velocity:

$$V_T(\text{SFM}) = (D_T * \pi * N_T)/12$$

(4) Adjust the tool or workpiece velocities, or the tool:workpiece rotational ratio (Rw), depending on the desired surface characteristics. For instance, tool and workpiece may be rotated asynchronously over some or all of the range of travel of the tool relative to the workpiece, or may be rotated synchronously within the limits of operation of the machine.

(5) Calculate a feed rate:

$$FR = F_T * N_W * Z_T$$

The power requirements of the compound machining operation may be evaluated as against the power available in the computer numerically controlled machine:

(6) Calculate material removal rates for milling and turning aspects:

$$MRR(\text{milling}) = W_T * F_T * V_W * 12$$

$$MRR(\text{turning}) = 12 * V_W * F_T * DOC_T$$

(7) Calculate the power required for milling and turning aspects:

$$\text{Power(milling)} = MRR(\text{milling}) * \text{material } K \text{ factor}$$

$$\text{Power(turning)} = MRR(\text{turning}) * \text{material } K \text{ factor}$$

(8) Calculate the total power available for turning:

$$\text{Torque transferred} = (\text{Power(milling)} * D_W)/(2 * V_T)$$

$$\text{Additional Turning Power} = (\text{Torque transferred} * V_W)/R_W$$

$$\text{Total power available} = \text{Power(main spindle)} + \text{Additional Turning Power}$$

(9) Confirm that the total power available for milling does not exceed the power of the tool spindle.

(10) Confirm that the power required for turning does not exceed the total power available for turning.

In some embodiments, the power of the tool and main spindles may be determined with reference to spindle power curves.

The foregoing has been described with reference to selection of the desired feed rate and workpiece turning velocity, but other parameters may be selected. For instance, in some embodiments, the desired feed rate and tool turning velocity may be selected, and the workpiece turning velocity and feed rate may be algorithmically determined. In other embodiments, other parameters are selected. In some embodiments, at least two parameters are selected. For instance, in some embodiments, two parameters are selected, one being a relative velocity of rotation and another being one of a tool rotational parameter (rotational rate or rotational velocity) and a workpiece rotational parameter (rotational rate or rotational velocity) are selected, and other processing parameters including at least a feed rate are determined algorithmically. The algorithmic determinations are not limited to the foregoing equations, and it is contemplated that other algorithmic determinations may be made.

Any suitable apparatus may be employed in conjunction with the methods of invention. In some embodiments, the methods are performed using a computer numerically controlled machine, illustrated generally in FIGS. 1-9. A computer numerically controlled machine is itself provided in other embodiments of the invention. The machine 100 illustrated in FIGS. 1-9 is an NT-series machine, versions of which are available from Mori Seki USA, Inc., the assignee of the present application. Other suitable computer numerically controlled machines include the NL-series machines with turret, also available from Mori Seiki USA, Inc. (not shown). Other machines may be used in conjunction with this disclosure.

Figure 2:
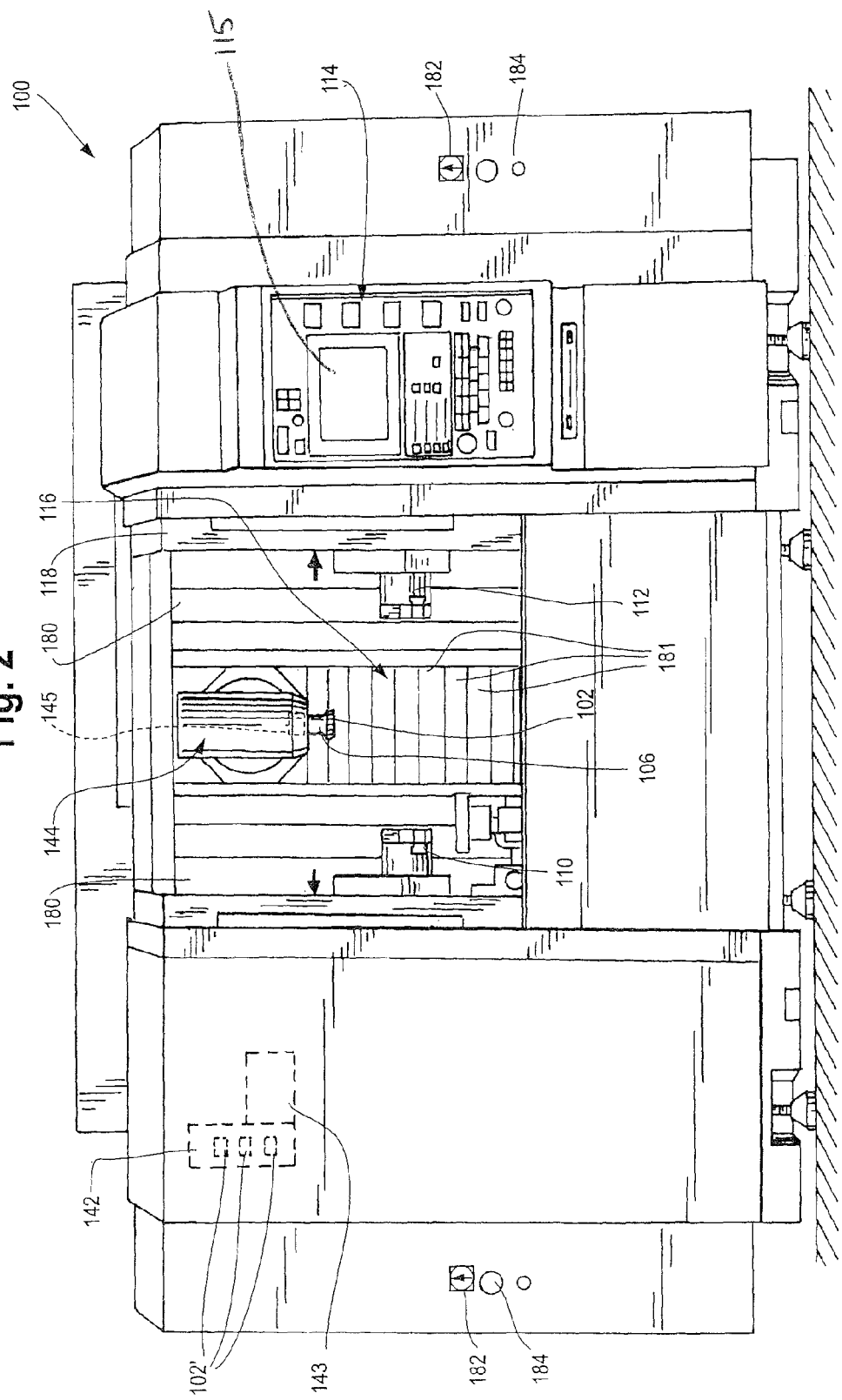
FIG. 2 is a front elevation of a computer numerically controlled machine illustrated in FIG. 1, shown with the safety doors open.
Figure 3:
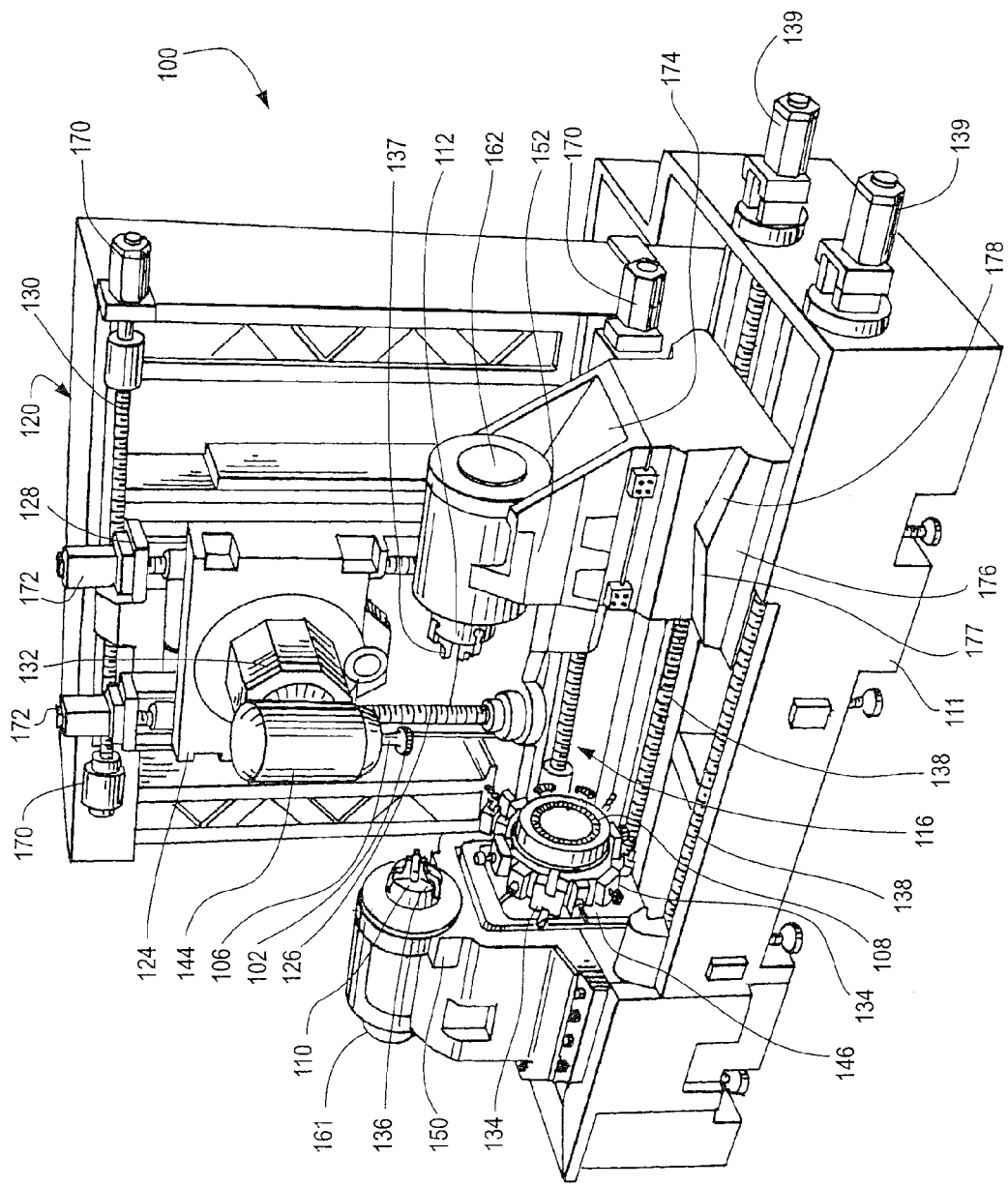
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system 114 operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising an input device in the form of a user interface system (shown generally at 114 in FIG. 1). The machine 100 may further include an output device, such as display 115. A second computer system (not illustrated) may be operatively connected to the first computer system to control operation of the spindle, the turret, and the other instruments of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143 (shown in FIGS. 1 and 2). These cooperate with the spindle 144 to permit the spindle to operate with a variety of cutting tools (shown in FIG. 1 as tools 102'). The spindle 144 is mounted on a carriage assembly 120 that allows for translational movement along the X- and Z-axes, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection and holds the cutting tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 110. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
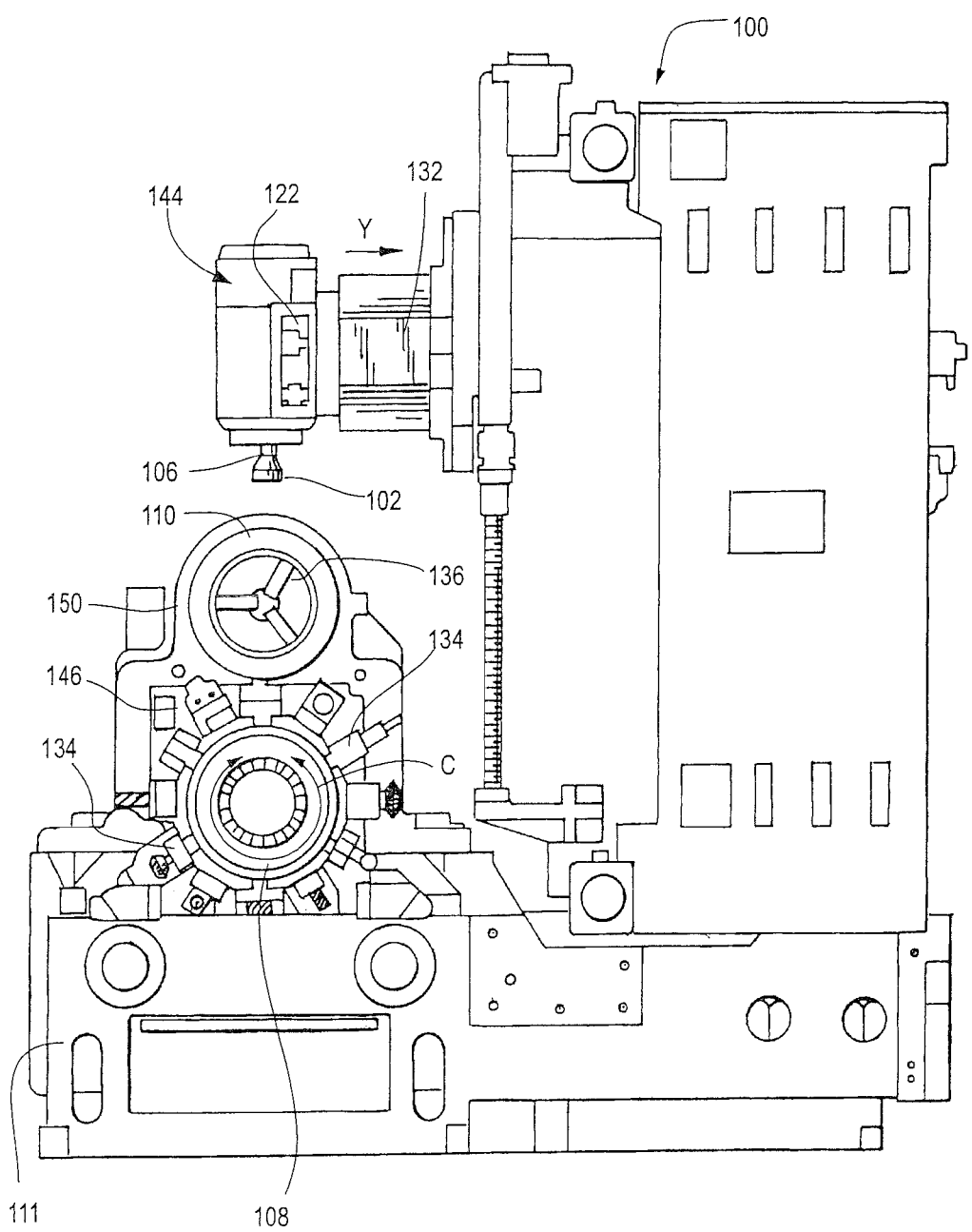
FIG. 5 is a side view of the first chuck, machining spindle, and turret of the machining center illustrated in FIG. 1.
Figure 6:
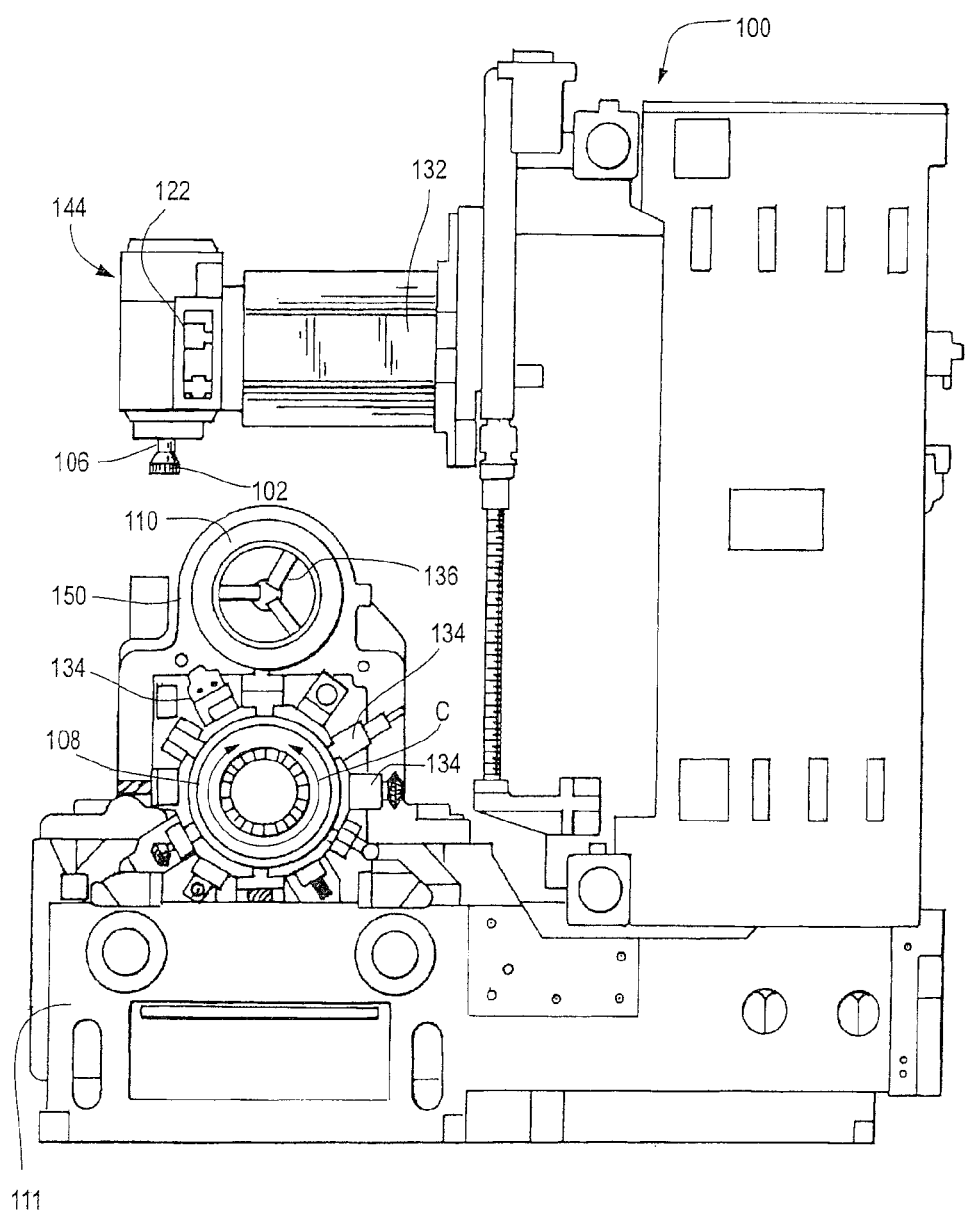
FIG. 6 is a view similar to FIG. 5 but in which a machining spindle has been translated in the Y-axis.
Figure 9:
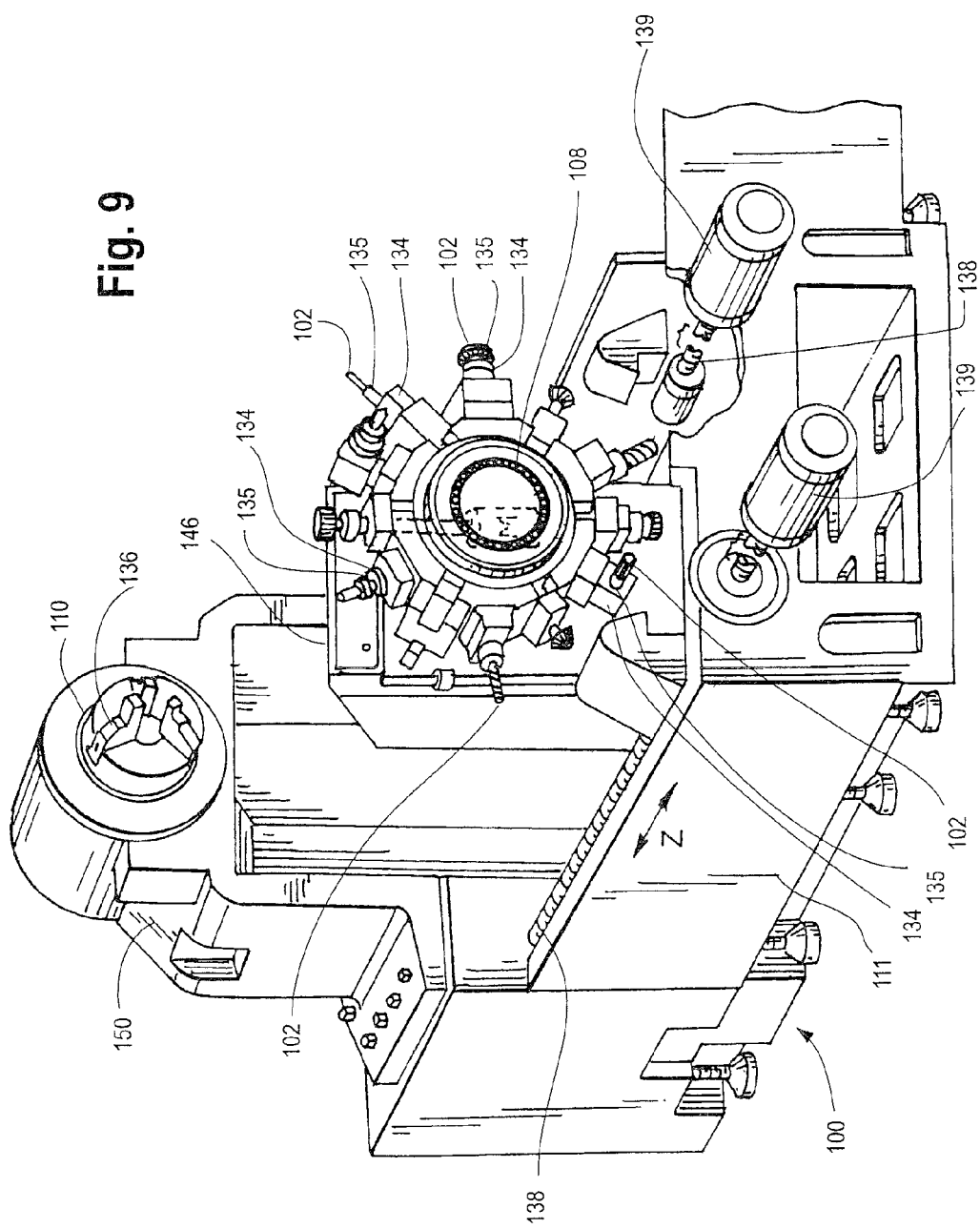
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool 102. Since the turret 108 can have a variety of turret connectors 134 and tool holders 135, a variety of different cutting tools 102 can be held and operated by the turret 108. The turret 108 may be rotated in a C' axis to present different ones of the tool holders (and hence, in many embodiments, different tools) to a workpiece.

Figure 4:
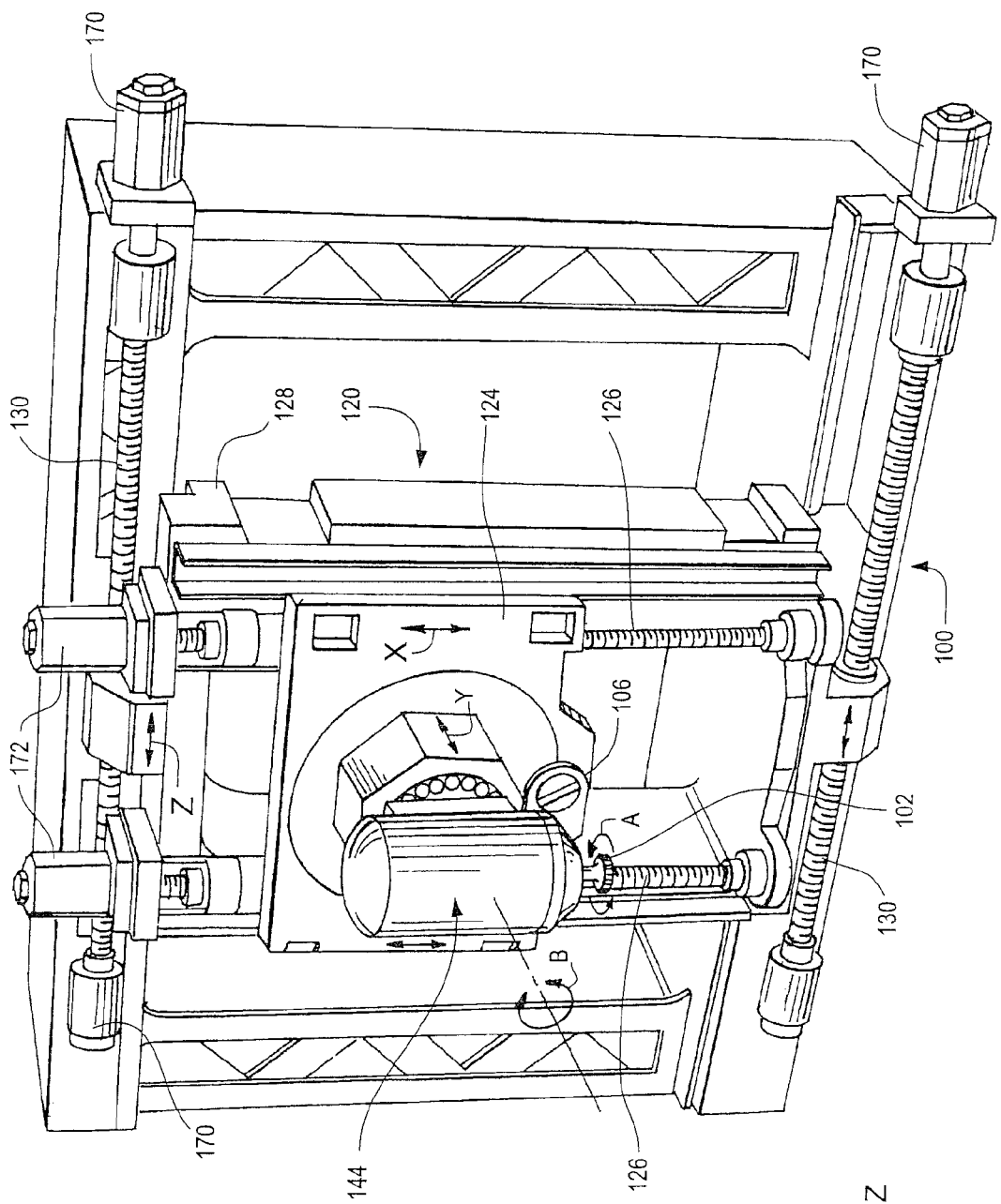
FIG. 4 a perspective view, enlarged with respect to FIG. 3 illustrating the machining spindle and the horizontally and vertically disposed rails via which the spindle may be translated.
Figure 7:
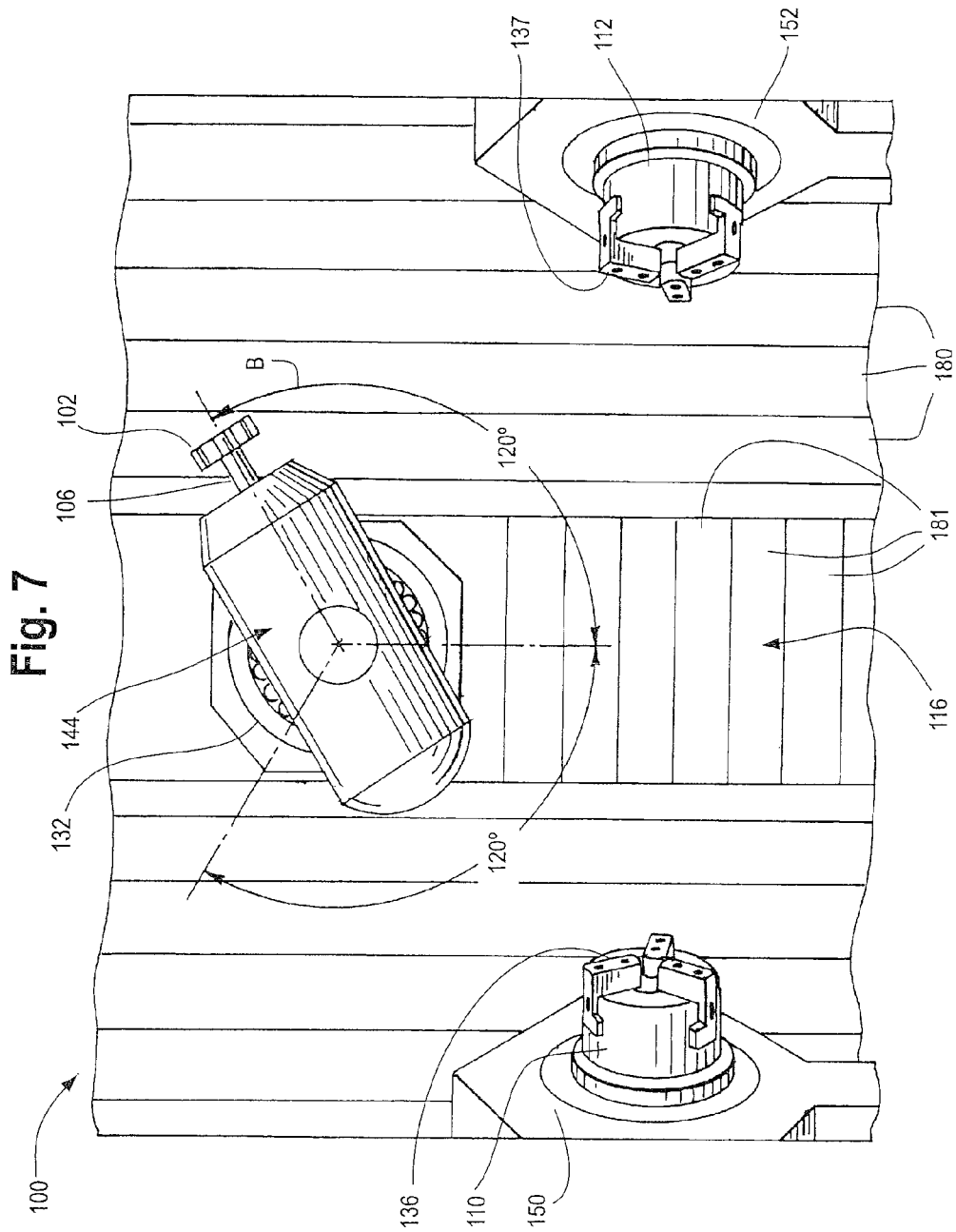
FIG. 7 is a front view of the spindle, first chuck, and second chuck of the computer numerically controlled machine illustrated in FIG. 1, including a line depicting the permitted path of rotational movement of this spindle.
Figure 8:
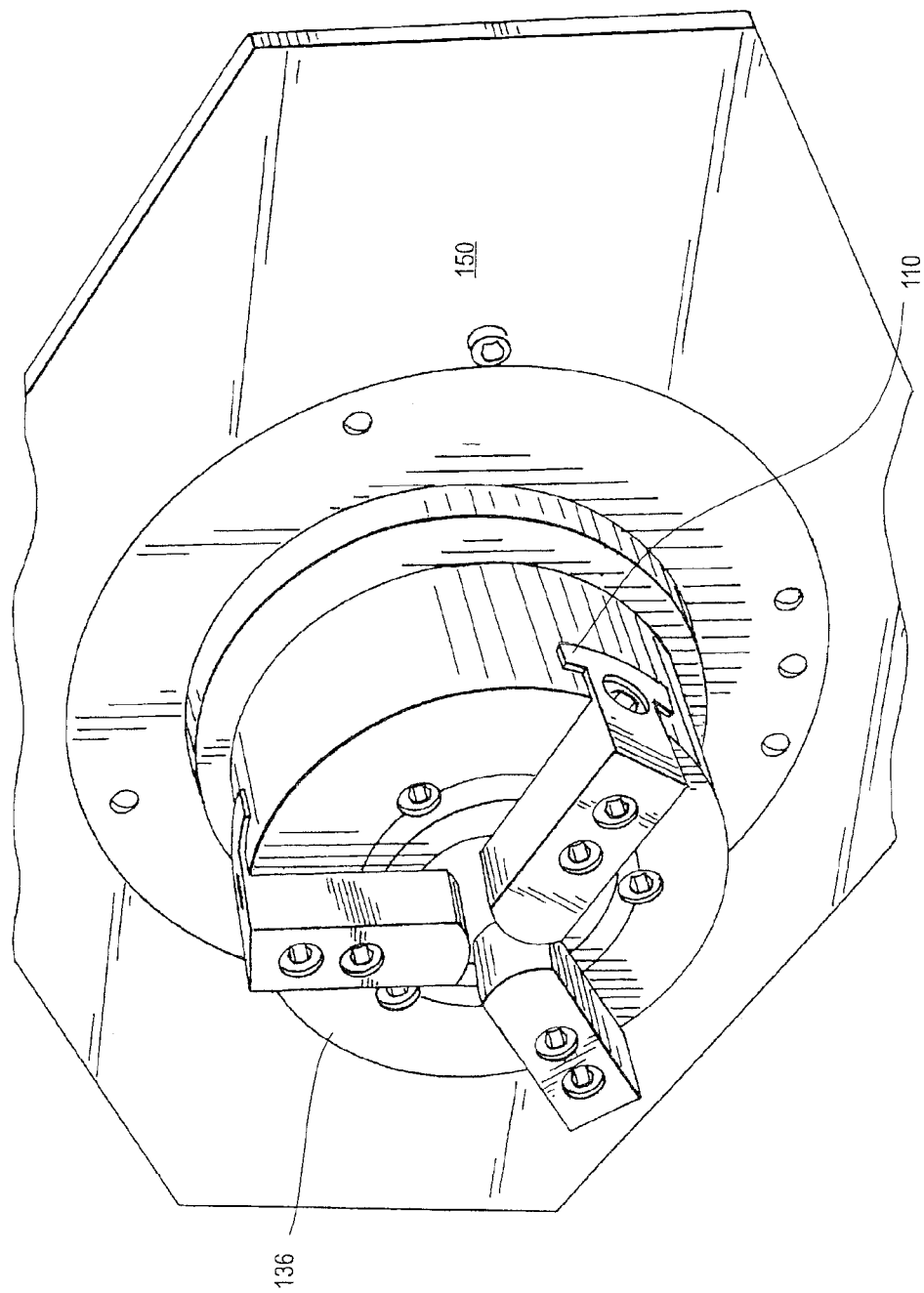
FIG. 8 is a perspective view of the second chuck illustrated in FIG. 3 enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connections 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connection 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

In prior art operations, as shown in FIG. 10, tool 201 rotates in direction 202 and workpiece 203 rotates in direction 204. The workpiece 203 has initial diameter 205 and machined diameter 206 which results upon removal of material from the workpiece. The tool contains tool tips or teeth 207, which contact the workpiece to cause removal of material therefrom. The workpiece turns in direction represented by arrow at a speed that is typically very low, on the order sufficient to provide a surface velocity typically of less than 10 m/min. Arrow 204 alternatively may represent motion of the tool around a stationary workpiece.

In accordance with one embodiment, a machine as described hereinabove, or another suitable machine, is provided. The machine has a first retainer that retains a workpiece and a second retainer that retains a tool. It is contemplated that the tool employed in a compound machining operation may be a milling tool, that is, a tool with a defined cutting surface (unlike a grinding tool). Numerous milling tools are known in the art, and it is contemplated that known milling tools or other tools as may be found to be suitable may be employed in conjunction with the invention.

Figure 16:
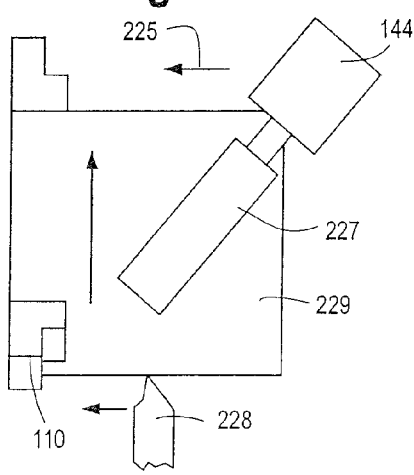
FIG. 16 is a representational view of a tool and workpiece in a compound machining operation in accordance with another embodiment of the invention, illustrating use of a turning tool in combination with a milling tool.

As illustrated, for instance, in FIGS. 12 and 13, the tool 208 may be retained in a spindle 144 (not shown in FIG. 12) and a workpiece 209 may be retained in the chuck 110 of the machine. Alternatively, the tool may be retained in another retainer in the machine such as a turret retainer. The tool and the workpiece each are rotated, in some embodiments to provide a surface velocity of at least 25 m/min. The first retainer is moved relative to the second retainer in a direction having at least a z-axis component (e.g. direction 225, as illustrated in FIGS. 14 and 16) to cause the tool to contact the workpiece. Either the tool or the chuck, or both, may be moved relative to the machine. Preferably, the infeed per revolution of the work is kept small enough to minimize the change in clearance geometry of the cutting edge between the time the tool engages the work and when it exits.

In the embodiment shown in FIG. 11, tool 210 rotates in direction 211, and workpiece 212 rotates in direction 213. The tool contains tool tips or teeth 207A, which contact the workpiece to cause removal of material therefrom. In the illustrated embodiment, the tool rotates about an axis of rotation that is parallel to the axis of rotation of the workpiece. Both the tool and the workpiece may be rotated sufficiently to provide a surface velocity of 25 m/min or more. For instances, the surface velocity may be at least 50 m/min, at least 75 m/min, at least 100 m/min, at least 150 m/min at least 200 m/min, at least 250 m/min, at least 300 m/min, at least 400 m/min, at least 500 m/min, at least 1,000 m/min, at least 2,000 m/min, at least 5,000 m/min, at least 6,000 m/min, or any other suitable value.

Figure 22:
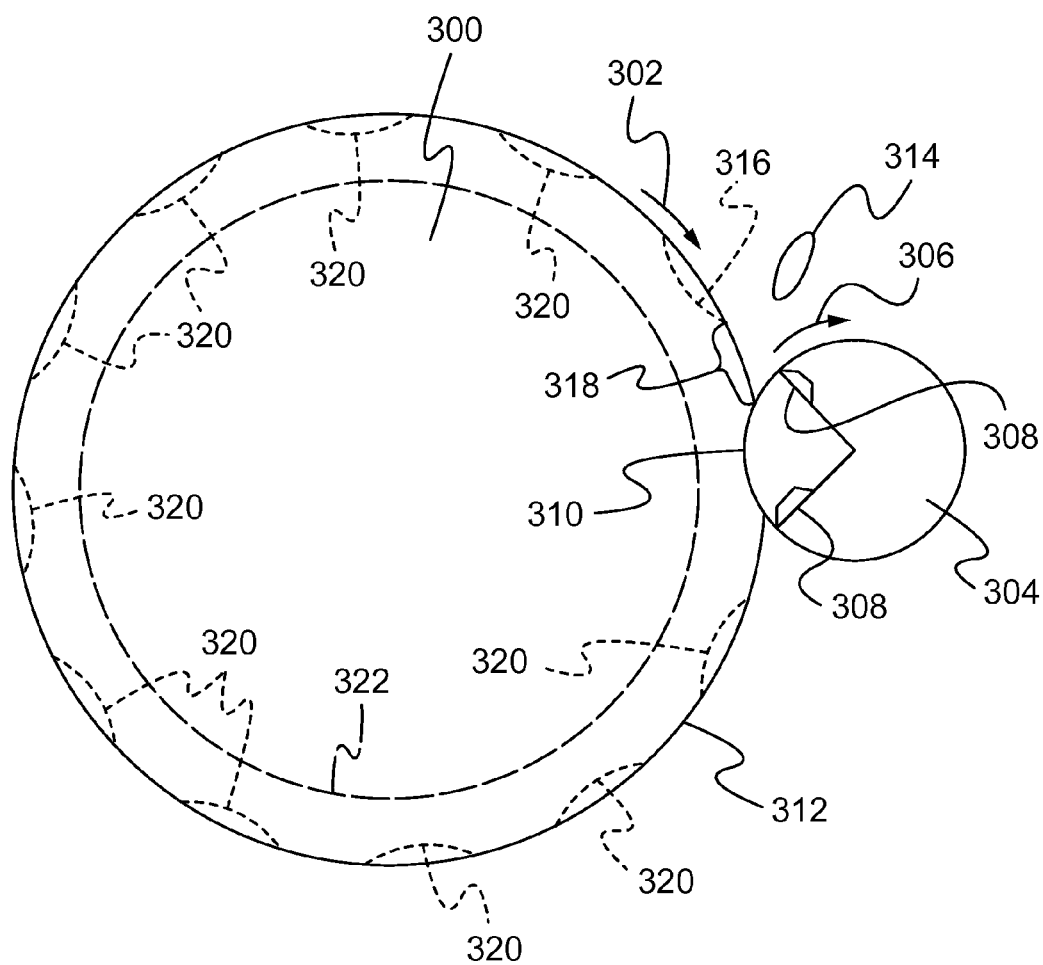
FIG. 22 is a representation of a portion of a computer numerically controlled machine having a tool engaging discrete locations on a workpiece to produce a machined surface that extends continuously around the workpiece.

In an alternative embodiment illustrated in FIG. 22, a workpiece 300 is rotated continuously in a selected direction, such as in the direction of arrow 302. A tool 304 is also rotated in a selected direction, such as in the direction of arrow 306, and includes at least one cutting surface 308. The tool 304 is positioned relative to the workpiece 300 so that the at least one cutting surface 308 engages the workpiece at a first discrete circumferential location 310 on a periphery 312 of the workpiece 300. As shown in FIG. 22, the cutting surface 308 engages only a portion of the periphery 312 to remove a discrete chip 314 from the workpiece 300. As the workpiece 300 and tool 304 continue to rotate, the at least one cutting surface 308 engages a second discrete circumferential location 316 on the periphery 312 of the workpiece 300. A tool surface velocity $V_T$ may be controlled relative to the workpiece surface velocity $V_W$ so that the first and second discrete circumferential locations are discontinuous. That is, a space 318 may be provided between the first and second discrete circumferential locations 310, 316. The workpiece 300 and tool 304 may be rotated for a sufficient period so that the tool 304 makes multiple iterative passes over the workpiece periphery 312. Accordingly, the at least one cutting surface 308 will engage multiple subsequent discrete circumferential locations 320. The first discrete circumferential location 310, second discrete circumferential location 316, and multiple subsequent discrete circumferential locations 320 may be located to form a machined surface 322 on the workpiece 300 that extends continuously around the workpiece 300.

FIG. 11 illustrates rotation of the tool in an axis that is parallel to the axis of rotation of the workpiece, but other orientations are possible. For instance, as shown in FIGS. 15C and 15D, the tool may be rotated in an axis that is perpendicular to a plane that contains the axis of rotation of the workpiece and that contains to the point of contact of the tool and workpiece. In these embodiments, generally a helical tool may be employed. The $V_R$ will be calculated with a directional factor DIR that accounts for the angle of the helix.

Figure 15A:
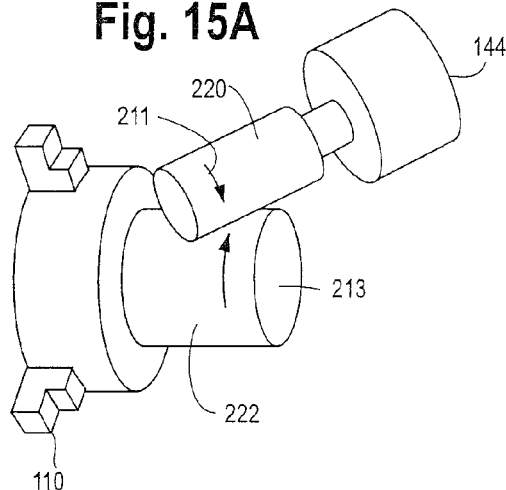
FIGS. 15B-D are perspective views of tools and workpieces alternative compound machining operations.
Figure 15C:
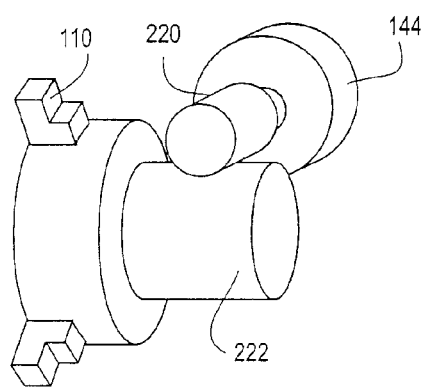

In other embodiments, the tool rotates in an axis that is oblique to a plane that contains the axis of rotation of the workpiece and the point of contact of the tool 220 and workpiece 222, as illustrated, for instance, in FIGS. 15A and B.

Figure 15B:
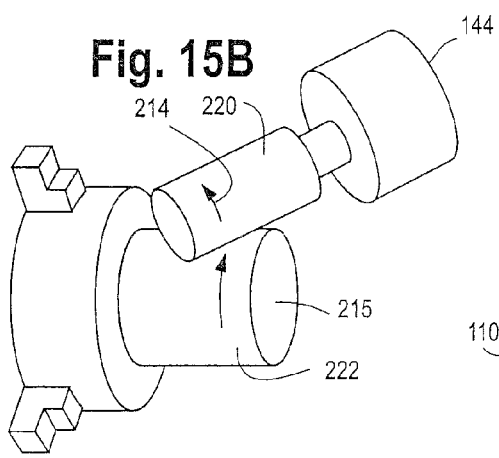
Figure 15D:
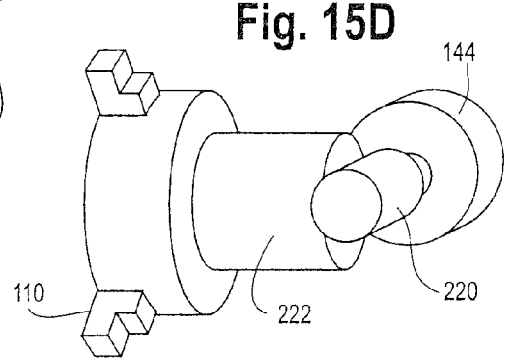

The tool may be rotated in a positive direction or in a negative direction relative to the rotating workpiece. In the negative direction of rotation, a point of contact on the tool surface and a point of contact on the workpiece surface move in tangential directions that are the same relative to each other. In other words, in the positive direction of rotation, the tool and the workpiece are rotating at least partially "with" each other. Rotation of the tool in the negative direction is illustrated in FIG. 15A via arrows 211, 213. In the positive direction of rotation, a point of contact on the tool surface and a point of contact on the workpiece surface move in tangential directions that are opposite relative to each other. In other words, in the positive direction of rotation, the tool and the workpiece are rotating at least partially "against" each other. Rotation of the tool in a positive direction is illustrated in FIG. 15B via arrows 214, 215. When milling tools are rotated in a negative direction, generally speaking tools with a high helix are generally desirable. A portion of the cutting forces will be applied axially, reducing the torque required of the milling spindle.

Figure 18:
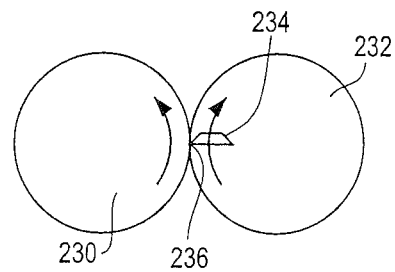
FIG. 18 is a representation of a portion of a computer numerically controlled machine having a workpiece and a tool configured to execute a negative relative rotation therebetween.
Figure 19:
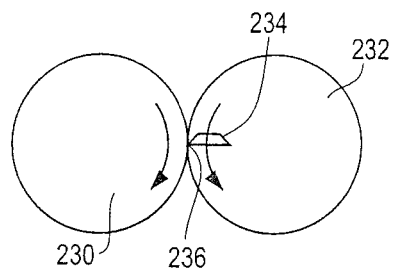
FIG. 19 is a representation of a portion of a computer numerically controlled machine having a workpiece and a tool configured to execute a negative relative rotation therebetween.
Figure 20:
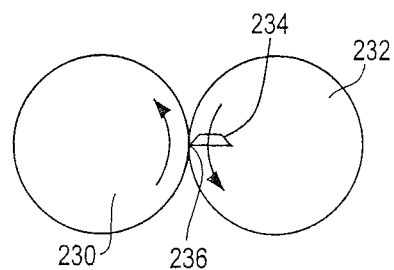
FIG. 20 is a representation of a portion of a computer numerically controlled machine having a workpiece and a tool configured to execute a positive relative rotation therebetween.
Figure 21:
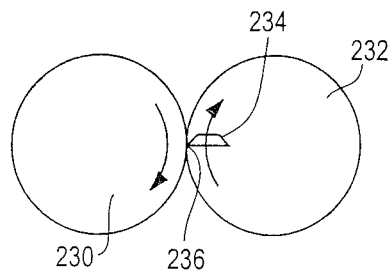
FIG. 21 is a representation of a portion of a computer numerically controlled machine having a workpiece and a tool configured to execute a positive relative rotation therebetween.

FIGS. 18-21 illustrate various configurations of a workpiece 230 and a tool 232 having an insert 234 with a cutting edge 236. FIG. 18 illustrates negative relative rotation between the tool and the workpiece, and calculation of $V_R$ is subtractive in nature. In this configuration, machining will occur successfully when $V_W > V_T$, which ensures that the cutting edge 236 of the tool insert 234 properly contacts the workpiece. As described above, when $V_R$ approaches zero (i.e., $V_W$ approaches $V_T$), problems such as tool breakage may occur. FIG. 19 also illustrates negative relative rotation between the tool and the workpiece, and calculation of $V_R$ is subtractive in nature. In this configuration, machining will occur successfully when $V_W < V_T$, which ensures that the cutting edge 236 of the tool insert 234 properly contacts the workpiece. As described above, when $V_R$ approaches zero, problems such as tool breakage may occur. FIG. 20 illustrates positive relative rotation between the tool and the workpiece, and calculation of $V_R$ is additive in nature. In this configuration, machining will occur successfully at all times, because the cutting edge 236 of the tool insert 234 always properly contacts the workpiece. FIG. 21 illustrates positive relative rotation between the tool and the workpiece. In this configuration, machining will not occur successfully, because the cutting edge 236 of the tool insert 234 improperly contacts the workpiece.

As illustrated in FIGS. 12, 13, 14, and 16, various tools may be brought to bear on the surface of the workpiece. FIG. 14 illustrates a tool 224 and a workpiece 226, and FIG. 16 illustrates two tools 227, 228, and a workpiece 229. Other tools besides those shown may be employed, and the invention is not contemplated to be limited to a particular type of tool. Generally, coated or uncoated tools may be employed, and each edge of the tool can be manufactured from a wide variety of materials depending on sensitivity to cost and the material to be machined. For instance, carbides are typically used for the tools when cutting steels, while ceramics are commonly used to machine irons and high temperature alloys. CBN is typically used for hardened steels and irons. Diamond (natural or synthetic) is used to machine aluminum, titanium, certain plastics, and the like. The cutting tools can be coated to improve their life. Where the mode of failure is abrasive, the coating may be harder than the substrate. Where the mode of failure is associated with heat, the coating may be refractory. The tools are sometimes provided with cooling means, typically based on oil or water, although liquid nitrogen and other materials are occasionally used. These illustrations and guidelines are exemplary, and, in practice, any suitable tool may be used. The tools may be provided with devices for delivering cooling fluids. Such fluids typically are based on oil or water, although liquid nitrogen and other materials are occasionally used.

In some embodiments, a turning or other cutting tool, such as tool 228 illustrated in FIG. 16, is used simultaneously or sequentially with the milling tool 227 employed in the compound machining operation. The tooling turn typically will produce a single unbroken chip, and embodiments wherein solely discrete plural broken chips are desired, such a cutting tool ordinarily should not be used. The turning or cutting tool may be any tool suitable for use in a turning operation, and, in the context of the present invention connotes moving tools such as tools with spinning or rotating inserts, as taught in U.S. Pat. No. 7,156,006, issued Jan. 2, 2007.

In still other embodiments, multiple tools are used in a compound machining operation. For instance, certain computer numerically controlled machines available from Mori Seiki USA, Inc. contain multiple turrets, and it is contemplated that a turning or milling tool may be employed in each operating turret retainer and in the spindle retainer. It is contemplated that a tool may be employed in a chuck of a computer numerically controlled machine.

Figure 17:
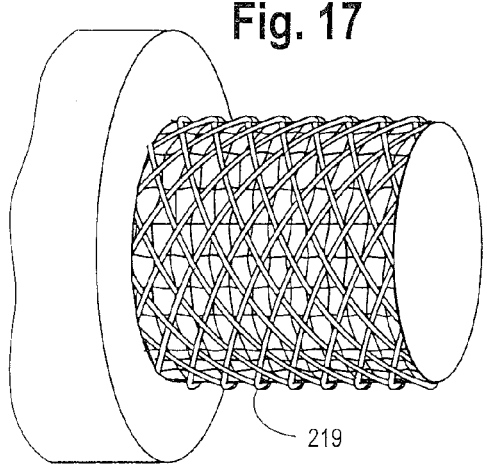
FIG. 17 is a perspective view of a workpiece that has been roughened in accordance with one embodiment of the invention, illustrating a surface having a knurled-like pattern.

As illustrated in FIG. 17, the surface that results from the compound machining operation may be a surface having a knurled-like pattern. The surface having the knurled-like pattern 219 shown in FIG. 17 is not the sole surface configuration formed in accordance with the invention, but to the contrary is representative of innumerable surface variants. In many cases, a subsequent finishing operation will be employed to further machine the surface having the knurled-like pattern to form a smooth surface. Alternatively, in some embodiments, a knurled-like pattern itself is desired. The invention contemplates selecting processing parameters effective for formation of a knurled-like pattern on the workpiece, the processing parameters including the speed of rotation of the workpiece, speed of rotation of the tool, a feed rate and a phase difference between the rotation of the workpiece and the rotation of the tool. Again, the rotation of the tool relative to the workpiece should be sufficiently asynchronous to cause formation of the knurled-like pattern on the workpiece.

This disclosure contemplates not only methods for cutting a workpiece, but also a computer numerically controlled machine. Generally, the computer numerically controlled machine includes at least first and second retainers and at least one cutting tool. The first and second retainers generally should be selected from among a spindle retainer, a turret retainer, a first chuck, and a second chuck. A computer control system, such as the computer control system 114 described hereinabove, includes a computer readable medium having disposed thereon code for causing rotation of the workpiece at a determined speed and code for causing rotation of a tool at a determined speed with a phase difference between the rotation of the workpiece and the rotation of the tool. The computer readable medium also includes code for causing the first retainer to move relative to the second retainer in a direction having at least a z-axis component to cause the tool to contact the workpiece. Rotation of the tool relative to the workpiece again is sufficiently asynchronous to cause discrete chips in material to be removed from the workpiece. A computer numerically controlled machine that includes a computer system that controls the motion and feed rate of the workpiece and tool to form knurled-like pattern by material removal forms another embodiment of the present invention.

The following Tables provide certain parameters that have been found suitable in a Mori Seiki NT-series mill/turn center. Compound machining occurs at nonzero tool velocities.

carbide tools. By selecting different values for the workpiece RPM, other parameters, including the tool RPM and the feed rate, were algorithmically determined in accordance with the above teachings.

Thus, some embodiments recognize a relative velocity of rotation between tool and workpiece and take advantage of the relationship between relative velocity and tool and workpiece velocities to allow for algorithmic calculation of processing parameters. In some embodiments, a method is provided in which discrete chips of material are removed from a workpiece in a compound machining operation. In other embodiments it is seen that a computer numerically controlled machine with specific computer programming is provided. In some embodiments, the method allows conventional cutting tools to be operated at two to ten times their normal speed. The machining operation can utilize two to ten times the usual power, but because the increase in power is in direct proportion to the increase in speed, no increase in peak torque is required, only an increase in the speed at which maximum torque in maintained. In some embodiments, the compound machining operation provides a duty cycle for the tool that permits the tool to be operated at a higher $V_T$ than is conventionally possible.

The appended claims are incorporated by reference into the disclosure. All references, including publications, patent applications, and patents, cited herein are hereby incorporated by reference. In any listing of possible ingredients or components, mixtures of the possible ingredients or components are contemplated unless expressly indicated otherwise. The description or connotation, if any, of certain embodiments as "preferred" embodiments, and other recitation of embodiments, features, or ranges as being preferred, is not deemed to be limiting, and the invention is deemed to encompass embodiments that are presently

TABLE 1

| Example | SFM Tool | SFM Work | SFM Net | Dia. Tool | RPM Tool | Dia. Work | RPM Work | Feed per rev | Feed Velocity |
|---|---|---|---|---|---|---|---|---|---|
| — | 0 | 1000 | 1000 | 1 | 0 | 4 | 955.414 | 0.01 | 9.55414 |
| 1 | 500 | 500 | 1000 | 1 | 1910.83 | 4 | 477.707 | 0.01 | 4.77707 |
| 2 | −500 | 1500 | 1000 | 1 | −1910.83 | 4 | 1433.12 | 0.01 | 14.3312 |
| 3 | −1000 | 2000 | 1000 | 1 | −3821.66 | 4 | 1910.83 | 0.01 | 19.1083 |
| 4 | −2000 | 3000 | 1000 | 1 | −7643.31 | 4 | 2866.24 | 0.01 | 28.6624 |
| 5 | 3000 | −2000 | 1000 | 1 | 11465 | 4 | −1910.83 | 0.01 | −19.1083 |
| 6 | 4000 | −3000 | 1000 | 1 | 15286.6 | 4 | −2866.24 | 0.01 | −28.6624 |
| — | 0 | 1000 | 1000 | 4 | 0 | 4 | 955.414 | 0.01 | 9.55414 |
| 7 | 500 | 500 | 1000 | 4 | 477.707 | 4 | 477.707 | 0.01 | 4.77707 |
| 8 | −500 | 1500 | 1000 | 4 | −477.707 | 4 | 1433.12 | 0.01 | 14.3312 |
| 9 | −1000 | 2000 | 1000 | 4 | −955.414 | 4 | 1910.83 | 0.01 | 19.1083 |
| 10 | −2000 | 3000 | 1000 | 4 | −1910.83 | 4 | 2866.24 | 0.01 | 28.6624 |
| 11 | 3000 | −2000 | 1000 | 4 | 2866.24 | 4 | −1910.83 | 0.01 | −19.1083 |
| 12 | 4000 | −3000 | 1000 | 4 | 3821.66 | 4 | −2866.24 | 0.01 | −28.6624 |

TABLE 2

| Example | SFM Tool | SFM Work | SFM Net | Dia. Tool | RPM Tool | Dia. Work | RPM Work | Feed per rev | Feed Velocity |
|---|---|---|---|---|---|---|---|---|---|
| — | 0 | 1000 | 1000 | 1 | 0 | 4 | 955.414 | 0.01 | 9.55414 |
| 13 | 2000 | 1000 | 1000 | 1 | 7643.31 | 4 | 955.414 | 0.01 | 9.55414 |
| — | 0 | 1000 | 1000 | 4 | 0 | 4 | 955.414 | 0.01 | 9.55414 |
| 14 | 2000 | 1000 | 1000 | 4 | 1910.83 | 4 | 955.414 | 0.01 | 9.55414 |

In each of the foregoing examples the relative rotational velocity between the tool and workpiece was 1000 surface feet per minute, a value typical of cutting mild steel with deemed to be less preferred. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention unless otherwise claimed. Any statement herein as to the nature or benefits of the invention or of the preferred embodiments is not intended to be limiting, and the appended claims should not be deemed to be limited by such statements. More generally, no language in the specification should be construed as indicating any non-claimed element as being essential to the practice of the invention. This invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The description herein of any reference or patent or equipment, even if identified as "prior," is not intended to constitute a concession that such reference or patent is available as prior art against the present invention.

What is claimed is:

1. A method of machining a workpiece comprising:
    rotating the workpiece around a workpiece axis and at a workpiece rotational speed $N_W$ so that a point on a periphery of the workpiece has a workpiece surface velocity $V_W$;
    rotating a tool having at least one cutting surface around a tool axis and at a tool rotational speed NT so that the at least one cutting surface has a tool surface velocity $V_T$;
    positioning the tool axis at a fixed location relative to the workpiece axis so that the at least one cutting surface engages the workpiece at multiple circumferential locations around the periphery of the workpiece as the tool and workpiece are rotated, wherein, with the tool axis at the fixed location, the workpiece and the tool are rotated for a sufficient duration so that the tool traverses multiple rotational passes around the periphery of the workpiece while the workpiece and the tool engage at the multiple circumferential locations;
    controlling the tool surface velocity $V_T$ relative to the workpiece surface velocity $V_W$ so that the circumferential locations for each of the rotational passes around the periphery of the workpiece are discrete and discontinuous; and
    controlling the workpiece rotational speed $N_W$ and the tool rotational speed $N_T$ so that a ratio of the workpiece rotational speed $N_W$ to the tool rotational speed $N_T$ is a non-integer selected such that none of the circumferential locations are repeated during the multiple rotational passes.

2. The method of claim 1, in which the multiple circumferential locations form a machined surface on the workpiece that extends continuously around the workpiece.

3. The method of claim 1, in which a relative surface velocity $V_R$ is equal to a vector sum of the workpiece surface velocity $V_W$ and the tool surface velocity $V_T$, and in which controlling the tool surface velocity $V_T$ relative to the workpiece surface velocity $V_W$ includes selecting a tool surface velocity $V_T$ and a workpiece surface velocity so that the relative surface velocity $V_R$ does not equal zero.

4. The method of claim 3, in which the workpiece surface velocity $V_W$ is at least 25 m/min.

* * * * *